United States Patent
Schwaderer et al.

(10) Patent No.: US 11,974,567 B2
(45) Date of Patent: May 7, 2024

(54) METHOD FOR APPLYING A SPRAY ONTO A FIELD

(71) Applicant: Robert Bosch GmbH, Stuttgart (DE)

(72) Inventors: Peter Schwaderer, Wildberg (DE); Jochen Fehse, Friolzheim (DE); Nicolas Houis, Bietigheim-Bissingen (DE)

(73) Assignee: ROBERT BOSCH GMBH, Stuttgart (DE)

( * ) Notice: Subject to any disclaimer, the term of this patent is extended or adjusted under 35 U.S.C. 154(b) by 417 days.

(21) Appl. No.: 16/626,121

(22) PCT Filed: Jun. 21, 2018

(86) PCT No.: PCT/EP2018/066546
§ 371 (c)(1),
(2) Date: Dec. 23, 2019

(87) PCT Pub. No.: WO2019/002077
PCT Pub. Date: Jan. 3, 2019

(65) Prior Publication Data
US 2020/0221681 A1 Jul. 16, 2020

(30) Foreign Application Priority Data
Jun. 27, 2017 (DE) .......................... 102017210804.5

(51) Int. Cl.
*A01M 7/00* (2006.01)
*B05B 12/12* (2006.01)

(52) U.S. Cl.
CPC ........... *A01M 7/0089* (2013.01); *B05B 12/12* (2013.01)

(58) Field of Classification Search
CPC .... A01C 21/007; A01M 7/0089; B05B 12/12; B05B 12/122; B05B 12/124; G06V 20/188; G01N 33/0098; G01J 3/0229
See application file for complete search history.

(56) References Cited

U.S. PATENT DOCUMENTS 5,585,626 A * 12/1996 Beck .......................... G01J 1/44
250/559.38
10,255,670 B1 * 4/2019 Wu ......................... H04N 7/183
(Continued)

FOREIGN PATENT DOCUMENTS

| DE | 4132637 A1 | 4/1993 |
|----|------------|--------|
| DE | 4132637 C2 | 4/1995 |

(Continued)

OTHER PUBLICATIONS

International Search Report for PCT/EP2018/066546, dated Sep. 24, 2018.

*Primary Examiner* — Tuongminh N Pham
(74) *Attorney, Agent, or Firm* — NORTON ROSE FULBRIGHT US LLP; Gerard A. Messina

(57) ABSTRACT

A method for applying a spray, in particular a plant protection product, onto a field, including: detecting plants in a field section of the field with the aid of an optical and/or infrared detection unit; identifying at least one plant row in the detected field section; defining a plant area encompassing the at least one identified plant row and a weed area, different from the plant area, in the detected field section; ascertaining a plant identifier of the weed area; and applying spray onto the weed area, in particular onto the field section, depending on the ascertained plant identifier with the aid of a spraying device.

22 Claims, 2 Drawing Sheets

(56) References Cited

U.S. PATENT DOCUMENTS

| | | | |
|---|---|---|---|
| 2014/0001276 A1* | 1/2014 | Joergensen | A01M 21/043 |
| | | | 239/69 |
| 2014/0021267 A1 | 1/2014 | Sudduth et al. | |
| 2017/0223947 A1* | 8/2017 | Gall | A01B 79/005 |
| 2018/0024050 A1* | 1/2018 | Hollstein | G01N 33/0098 |
| | | | 382/103 |
| 2019/0150357 A1* | 5/2019 | Wu | G06T 7/73 |

FOREIGN PATENT DOCUMENTS

| | | |
|---|---|---|
| DE | 4413739 A1 | 10/1995 |
| DE | 19642439 C1 | 11/1997 |
| DE | 19858168 A1 | 6/2000 |
| RU | 2231259 C2 | 6/2004 |
| WO | 9737372 A1 | 10/1997 |
| WO | 9919824 A1 | 4/1999 |
| WO | 2012122988 A1 | 9/2012 |

* cited by examiner

METHOD FOR APPLYING A SPRAY ONTO A FIELD

FIELD OF THE INVENTION

The present invention is directed to a method for applying a spray, in particular a plant protection product, onto a field and to a spraying system. A control unit and a computer program are also a subject matter of the present invention.

BACKGROUND INFORMATION

A plurality of active agents is utilized in conventional agriculture for fertilization, growth support, and, in particular, for protecting the cultivated plants. This protection is directed to infestation by weeds (herbicides), fungus (fungicides), insects (insecticide), and disease. These agents are typically applied onto the field as an aqueous solution with the aid of a hydraulic spraying system. Once infestation has been discovered, the amount to apply was previously adjusted by the user, with the aid of random sampling, with respect to the type and intensity of the infestation and applied to the entire area in a constant manner. Since a uniform infestation of the field area may not be assumed, this procedure results in the release of too much active agent into the surroundings. In addition, the operating costs (=spray costs) of the user could be reduced by avoiding this excessive amount.

A precondition for an application according to demand is a locally highly resolved knowledge of the type and intensity of the infestation, as well as the technical possibility to variably adapt the location and amount of the spray. Existing aerial photographs (satellite, aircraft, UAV), for example, may be utilized for observing the locally resolved infestation. Higher accuracy without the effort to create aerial photographs is made possible, however, with the aid of parallel sensing during the application of the agent.

Sensors for detecting the color green of plants are already related art. In this case, however, no differentiation is made between cultivated plants and weeds, which does not allow for potential savings primarily with respect to the use of selective herbicides. Optical systems for detecting and classifying the weed infestation inspect an image section for the color green of plants and, thereafter, carry out a classification, i.e., a determination of the type of the observed plant. Known digital cameras including objectives, possibly in combination with light wavelength-specific filters, may be utilized in this case. With the aid of the information obtained from the classification, the particular effective herbicide may be added to the mixture and applied according to the occurrence of types of weeds.

Patent document DE 44 13 739 A1 discusses a method for the targeted, specific, metered application of nutrients and cultivation media in agriculture or horticulture. In this case, the wild plants in the spaces between the rows are selectively treated, similarly to the cultivated plants.

Patent document DE 41 32 637 C2 discusses a method for combatting weeds in a controlled manner in dense crops not planted as row crops.

SUMMARY OF THE INVENTION

The subject matter of the present invention is a method for applying a spray, in particular a plant protection product, onto a field, including the steps:
  detecting plants in a field section of the field with the aid of an optical and/or infrared detection unit;
  identifying at least one plant row in the detected field section;
  defining a plant area encompassing the at least one plant row and a weed area, different from the plant area, in the detected field section;
  ascertaining a plant identifier of the weed area; and
  applying the spray onto the weed area, in particular onto the field section, depending on the ascertained plant identifier with the aid of a spraying device.

Moreover, the subject matter of the present invention is a spraying system, which is configured for carrying out steps of the above-described method.

The subject matter of the present invention is also a control unit, which is configured for controlling or activating the steps of this method, a computer program, which is configured for controlling or activating the steps of the method, as well as to a machine-readable memory medium, on which the computer program is stored.

The spray may be a plant protection product. The spray may therefore be, for example, an herbicide, a fungicide, or an insecticide.

In the present case, a field may be understood to be an agriculturally utilized area, an area under cultivation for plants, or also a parcel of such an area or area under cultivation. The field may therefore be an arable area, a grassland, or a meadow. The plants may include, for example, useful plants, whose fruit is utilized in an agricultural manner, for example, as food, feed, or as energy plants, as well as weeds.

The field section may be a detection section or a captured image section of an optical and/or infrared detection unit. An optical detection unit may be understood to be, for example, a camera or a 3D camera. The optical and/or infrared detection unit may be calibrated, in order, for example, to calculate the height assignment from the captured images. The optical and/or infrared detection unit may be situated on a mobile unit, the mobile unit being configured, in particular, as an agricultural vehicle and/or an aircraft and/or a trailer.

A detection of plants may be understood, for example, to be the determination of the presence of plants in the field section, in particular without a classification of the plants taking place.

The step of detecting plants may include a detection of a color component, in particular of a green color component and/or of an infrared component, in the field section or image section. In this case, plants may be detected with the aid of the optical and/or infrared detection unit, for example, on the basis of a predetermined NDVI value (normalized differenced vegetation index, which is formed from reflectance values in the near infrared and visible red wavelength ranges of the light spectrum), in that biomass is differentiated from ground (soil).

The step of detecting may take place, for example, during a traverse by a mobile unit, which encompasses the optical and/or infrared detection unit, across the field, the plants in the field section or captured image section of the optical and/or infrared detection unit being simultaneously detected.

The plant rows extend essentially in a straight line. Therefore, the identification of a plant row may take place, for example, by integrating a straight line or a straight plant-row mid-point line into an image trajectory having the highest green color component or green value. In the step of identifying, all plant rows in the detected field section may be identified.

The plant area may completely encompass the plants in the plant row. The plant area may also encompass the plant row, however, without the individual plants in the plant row being completely encompassed. Therefore, the plant area may also only partially encompass the individual plants in the plant row. The plant area may be defined around the particular plant-row mid-point line, for example, having a constant or defined width or a variable width. The plant area may also be the plant-row mid-point line itself, however.

The weed area may extend between the plant rows. The weed area may be a remaining area of the field section, which results according to the definition of the plant area.

The plant identifier may represent or be an extent to which the weed area is covered by plant material and/or an amount of plant material in the weed area and/or a number of plants in the weed area. The extent of coverage is defined via the ratio of area covered by plant material with respect to the total area. The extent of coverage is therefore the ratio of the overgrown area in the weed area with respect to the total weed area. For this purpose, the number of pixels in the captured image may be determined, at which plant material is detected. Accordingly, with the aid of the plant identifier, a dimension value for the infestation may be derived, depending on which it is decided whether and, if necessary, how the weed area is treated.

The step of applying may encompass a comparison of the ascertained plant identifier with a threshold value, the step of applying being carried out once the threshold value has been reached, undershot, or exceeded. The threshold value may be manually enterable. Depending on the culture in the field, on the growth stage, and on the utilized plant protection product, a so-called spraying rule may be stored in this case, i.e., a relationship between a determined plant identifier and the decision whether and how much plant protection product is to be applied. By way of example, the rule could be: "If the extent of coverage in the weed area is >5%, the application is carried out."

The steps (tasks) of identifying, of defining, and of ascertaining may be carried out with the aid of a computer unit.

The spraying device may encompass a plurality of nozzles and fluid tanks. The spraying device may be situated on a mobile unit, the mobile unit being configured, in particular, as an agricultural vehicle and/or an aircraft and/or a trailer. The spraying device may be situated on the same mobile unit as the detection unit. The application may take place continuously or according to a specific application pattern.

Due to the method according to the present invention, it is now possible to treat a field according to demand in a very simple and resource-saving way. Advantageously, no classification of the plants or plant objects is necessary in this case. Instead, the present invention makes use of the fact that the cultivated plants are cultivated in plant rows and the weeds and grass-weeds are non-uniformly distributed on the field. According to the present invention, a plant area encompassing the plant row and a weed area are therefore defined, where, by definition, all plants in the plant row are considered to be cultivated plants and all plants in the weed area are considered to be plants to be treated, in particular weeds. The applying or the application of the predefined spray then takes place onto the weed area, which may be onto the entire field section on the basis of an ascertained plant identifier, without a classification or selection and also regardless of the arrangement of the plants.

It is advantageous if, in the step of applying, the spray is applied essentially uniformly onto the weed area. A uniform application may be understood, within the scope of the present invention, to be an application utilizing a predefined application amount per area. A predefined application amount may be understood to be an application amount established before or at the beginning of the treatment. The predefined application amount is an essentially constant application amount per area in this case. The defined application amount may be preset or enterable in advance. The spray may be applied in a planar manner in this case. This measure results in a further simplification of the method or of the overall system, since, on the one hand, no regulation of the spray amount is necessary and, on the other hand, no identification of the plants or plant positions is necessary.

Moreover, it is advantageous if the identification of the plant row takes place by utilizing at least one of the following pieces of information: color component, in particular green color component of the detected plants, infrared component of the detected plants, plant spacing, plant row spacing, growth stage of the plants, GPS coordinates of a sowing of the plants. With the aid of these pieces of information, the plant rows may be identified in a simple and reliable way, since, for example, the cultivated plants are further along in the growth stage than the weeds and grass-weeds. The identification of the plant rows by utilizing a color component of the plants or of a detected plant image is also technically very simple and reliable, since, advantageously, sophisticated algorithms of image processing may be utilized for this purpose.

It is also advantageous if the plant area has a variable width, the width depending on a growth stage of a plant of the plant area situated in the corresponding area. Such a specific embodiment of the approach provided here offers the additional advantage that the different width growth of the cultivated plants in the plant area is also taken into account. As a result, the situation is prevented, in particular, in which parts of the cultivated plants, which extend into the weed area, are not evaluated as weeds. For this purpose, a tube around the actual plant-row mid-point is defined on the basis of the growth stage of the cultivated plant. Plant parts/pixels, which directly border a plant pixel from the cultivated plant area, are then also evaluated as cultivated plant (neighboring pixels).

A specific embodiment of the approach provided here is particularly advantageous, in which, in the step of detecting, the optical and/or infrared detection unit and/or, in the step of applying, the spraying device are/is situated on a vehicle and/or on an aircraft. Such a specific embodiment offers the advantage of a highly automated and, therefore, fast and reliable treatment of a field.

The method according to the present invention may be implemented, for example, in software or hardware or in a mixed form of software and hardware, for example, in a control unit.

For this purpose, the spraying system may include at least one processing unit for processing signals or data, at least one memory unit for storing signals or data, at least one interface to a sensor or an actuator for reading in sensor signals from the sensor or for outputting data or control signals to the actuator and/or at least one communication interface for reading in or outputting data which are embedded in a communication protocol. The processing unit may be, for example, a signal processor, a microcontroller, or the like, the memory unit being a flash memory, an EPROM, or a magnetic memory unit. The communication interface may be configured for reading in or outputting data in a wireless and/or wire-bound manner, a communication interface, which may read in or output wire-bound data, may read in these data, for example, electrically or optically from a corresponding data transmission line or outputting these data into a corresponding data transmission line.

In addition, a computer program product or a computer program including program code is advantageous, which may be stored on a machine-readable carrier or memory medium such as a semiconductor memory, a hard drive memory or an optical memory, and which may be used for carrying out, implementing, and/or controlling the steps of the method according to one of the above-described specific embodiments, in particular when the program product or program is carried out on a computer or a device.

Exemplary embodiments of the present invention are represented in the drawings and are explained in greater detail in the following description.

In the following description of favorable exemplary embodiments of the present invention, identical or similar reference numerals are used for the similarly functioning elements represented in the different figures, a repeated description of these elements being dispensed with.

DETAILED DESCRIPTION

Figure 1:
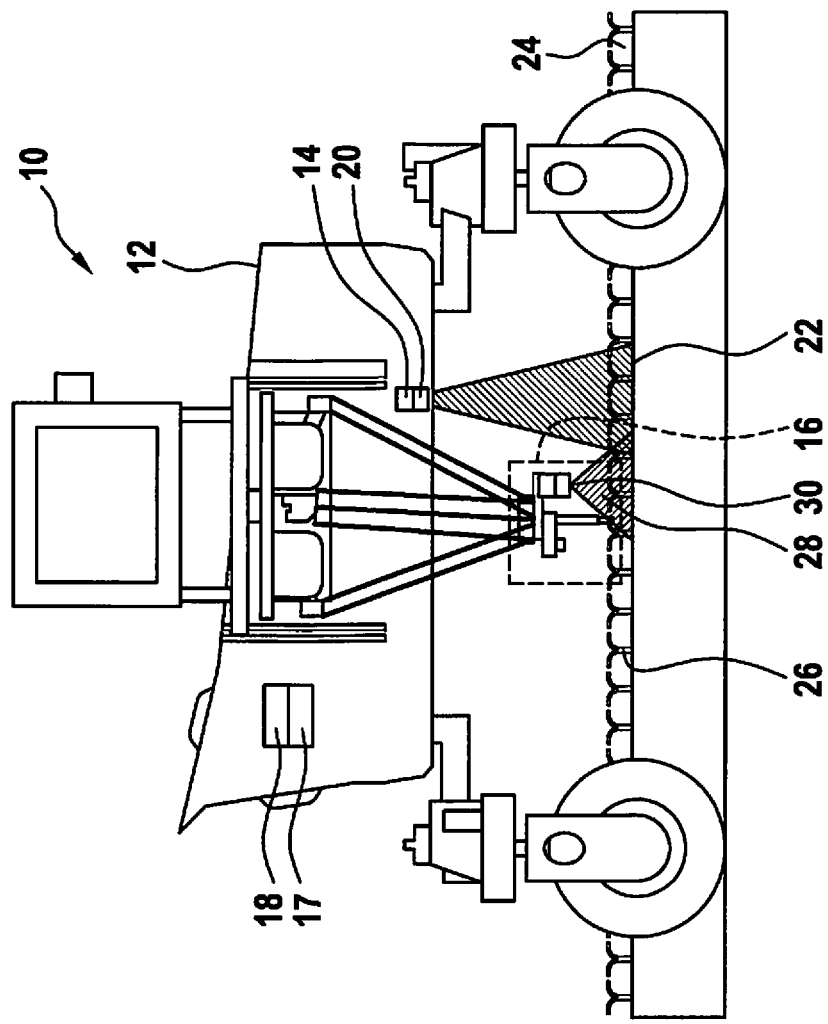
FIG. 1 shows a schematic representation of a spraying system according to the present invention.

FIG. 1 shows a spraying system 10 according to the present invention. Spraying system 10 encompasses a mobile agricultural vehicle 12. Moreover, spraying system 10 encompasses a detection unit 14 and a spraying device 16. Detection unit 14 and spraying device 16 are situated on agricultural vehicle 12. Spraying system 10 also encompasses a computer unit 17 and a control unit 18.

Detection unit 14 is configured as an optical detection unit 14 or optical camera 14. Optical camera 14 encompasses a filter unit 20, in order to extract a color component, such as the green color component of an image of a field section 22 of a field 24 detected by optical camera 16, in order to detect plants 26.

As explained in greater detail in the following with reference to FIG. 2, computer unit 17 is configured for identifying at least one plant row in detected field section 22 or in the captured image of field section 22, for example, on the basis of the detected green color component; defining a plant area encompassing the at least one identified plant row and a weed area different from the plant area in detected field section 22;

and, moreover, ascertaining a plant identifier of the weed area. The plant identifier, in this case, is the extent to which the weed area is covered by plant material.

Control unit 18 is configured for appropriately activating spraying device 14 depending on the ascertained plant identifier. A comparison of the ascertained plant identifier with a threshold value takes place in this case, spraying device 14 being appropriately activated once the threshold value has been reached or exceeded.

Finally, spraying device 14 is configured for outputting a spray 28 or a plant protection product 28 with the aid of a nozzle 30 onto the weed area, in particular field section 22, for treating plants 26.

Figure 2:
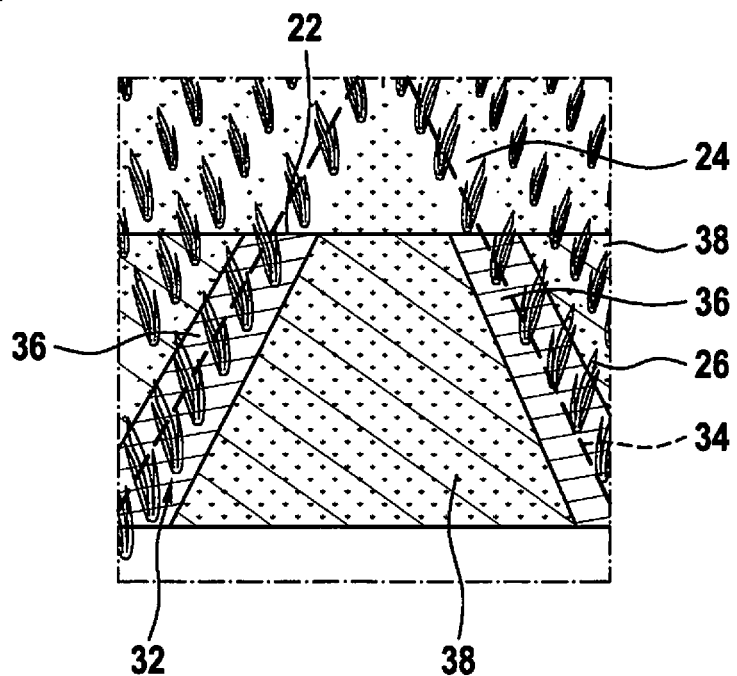
FIG. 2 shows a schematic representation of a detected field section.

FIG. 2 shows an oblique view of field 24, a direct view also being conceivable. A field section 22 of field 24 is characterized in this case with the aid of optical detection unit 14 of spraying system 10. It is apparent that, after the detection of plants 26 or of the green color component in field section 22, plant rows 32 were identified with the aid of computer unit 17. The identification of plant rows 32 takes place by integrating straight plant-row mid-point lines 34 in image trajectories having the highest green color component or green value.

As is also apparent from FIG. 2, a plant area 36, which encompasses plant rows 32, was defined. Plant area 36 was defined by utilizing the detected green color component. Plant area 36 may also have a variable width, which depends on a growth stage of a plant 26 of plant area 36, which is situated in the corresponding area.

Moreover, a weed area 38 was defined, which is different from plant area 36. Weed area 38 is situated between plant rows 32. In this case, weed area 38 is the area, which, by definition, includes only weeds. Weed area 38 is the remaining area of field section 22 minus plant area 36, i.e., the remaining area, which, according to the definition of plant area 36, is left over in field section 22 or in the captured image of field section 22.

Finally, whether and/or how field section 22 is to be treated is decided depending on the weed infestation of weed area 38. For this purpose, the plant identifier is ascertained, which represents the extent to which weed area 38 is covered by plant material. If the plant identifier reaches or exceeds a predefined threshold value, an application of spray 28 onto field section 22 takes place with the aid of spraying device 16, in order to treat field section 22 or plants 26 in field section 22.

Figure 3:
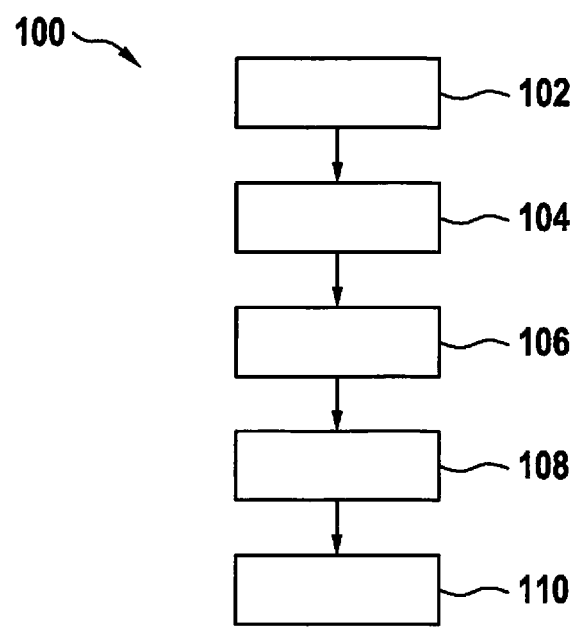
FIG. 3 shows a flow chart of a method according to one exemplary embodiment.

FIG. 3 shows a flow chart of an exemplary embodiment of the approach presented here, as method 100 for applying a spray 28, in particular a plant protection product 28, onto a field 24. Method 100 includes a step 102 of detecting plants 26 in a field section 22 of field 24 with the aid of an optical and/or infrared detection unit 14. Moreover, method 100 includes a step 104 of identifying at least one plant row 32 in field section 22. Method 100 also includes a step 106 of defining a plant area 36 encompassing the at least one identified plant row 32 and a weed area 38 different from plant area 36 in detected field section 22. Moreover, method 100 includes a step 108 of ascertaining a plant identifier of weed area 38. Finally, method 100 includes a step 110 of applying spray 28 onto weed area 38, in particular onto field section 22, depending on the ascertained plant identifier with the aid of a spraying device 16.

If an exemplary embodiment includes an "and/or" linkage between a first feature and a second feature, this is intended to be read that the exemplary embodiment according to one specific embodiment includes both the first feature and the second feature and, according to a further specific embodiment, includes either only the first feature or only the second feature.

What is claimed is:

1. A method for applying a spray onto a field, the method comprising:
    detecting, by a processor using output of an optical and/or infrared detection unit, plants in a field section of the field;
    identifying at least one plant row in the detected field section based on an arrangement recognized, by the processor, to be formed by some of the detected plants;
    based on the identification:
        defining, for each respective one of the at least one identified plant row, a respective plant area to encompass the respective identified plant row; and due to a remaining area of the detected field section being external to all of the at least one defined plant area, defining, by the processor, the remaining area as a weed area;

ascertaining, by the processor, a plant identifier of the weed area as a whole based on those of the plants detected by the processor that are in the defined weed area; and based on the definition of the weed area and on the ascertained plant identifier, applying the spray with a spraying device indiscriminately onto all of the weed area.

2. The method of claim 1, wherein the plant identifier is a ratio of a first portion of the weed area that is covered by the detected plants to an entirety of the weed area, which includes an area not covered by the detected plants, wherein the applying is performed conditional upon that the ratio is at least a predefined threshold value.

3. The method of claim 1, wherein, in the applying, the spray is applied according to a target uniform distribution of the spray over an entirety of the weed area.

4. The method of claim 1, wherein the detecting of the plants takes place by utilizing an infrared component in a detection field of the optical and/or infrared detection unit.

5. The method of claim 1, wherein the at least one plant row includes all plant rows that are in the detected field section.

6. The method of claim 1, wherein the defining of the at least one plant area is performed by identifying bounding areas around each of the at least one plant row such that a mid-point line of the respective plant row is a center of the respective bounding area of the respective plant row.

7. The method of claim 1, wherein the at least one plant area is defined by using neighboring pixels of the detected plants of the at least one plant row.

8. The method of claim 1, wherein a width of the at least one plant rows is variably set depending on a growth stage of the detected plants.

9. The method of claim 1, wherein the identifying is performed so that each of the at least one plant row extends essentially in a straight line.

10. The method of claim 1, wherein, in the detecting of the plants is performed are detected by utilizing a color component.

11. The method of claim 1, wherein the optical and/or infrared detection unit and/or the spraying device are/is situated on an agricultural vehicle and/or on an aircraft and/or on a trailer.

12. A spraying apparatus, comprising:
a spraying system configured for applying a spray onto a field, by performing the following:
detecting, by a processor of the spraying system using output of an optical and/or infrared detection unit, plants in a field section of the field;
identifying at least one plant row in the detected field section based on an arrangement recognized, by the processor, to be formed by some of the detected plants;
based on the identification:
defining, for each respective one of the at least one identified plant row, a respective plant area to encompass the respective identified plant row; and
due to a remaining area of the detected field section being external to all of the at least one defined plant area, defining, by the processor, the remaining area as a weed area;
ascertaining, by the processor, a plant identifier of the weed area as a whole based on those of the plants detected by the processor that are in the defined weed area; and
based on the definition of the weed area and on the ascertained plant identifier, applying the spray with a spraying device indiscriminately onto all of the weed area.

13. A non-transitory computer readable medium having a computer program, which is executable by a processor, comprising:
a program code arrangement having program code for applying a spray onto a field by performing a method, the method comprising:
detecting, by the processor using output of an optical and/or infrared detection unit, plants in a field section of the field:
identifying at least one plant row in the detected field section based on an arrangement recognized, by the processor, to be formed by some of the detected plants;
based on the identification:
defining, for each respective one of the at least one identified plant row, a respective plant area to encompass the respective identified plant row; and
due to a remaining area of the detected field section being external to all of the at least one defined plant area, defining, by the processor, the remaining area as a weed area;
ascertaining, by the processor, a plant identifier of the weed area as a whole based on those of the plants detected by the processor that are in the defined weed area; and
based on the definition of the weed area and on the ascertained plant identifier, controlling, by the processor a spraying device to apply the spray indiscriminately onto all of the weed area.

14. The computer readable medium of claim 13, wherein:
the plant identifier is a ratio of a first portion of the weed area that is covered by the detected plants to an entirety of the weed area, which includes an area not covered by the detected plants; and
the controlling is performed conditional upon that the ratio is at least a predefined threshold value.

15. The method of claim 1, wherein the spray includes a plant protection product.

16. The method of claim 10, wherein the color component is a green color component.

17. A method for applying a spray onto a field, the method comprising:
detecting, by a processor output of an optical and/or infrared detection unit, plants of the field;
identifying presence of weeds to be treated by performing the following:
analyzing, by the processor, a spatial distribution of all of the detected plants to identify straight lines formed by the spatial distribution;
classifying, by the processor and based on the analysis of the spatial distribution, areas bounding the identified straight lines as plant rows and all areas between the plant rows as a weed area; and
determining, as the identified presence of the weeds to be treated, that some of the detected plants are within the weed area; and
in response to the identification of the presence of the weeds to be treated, applying the spray indiscriminately onto all of the weed area with a spraying device;

wherein the identification of the presence of the weeds to be treated is performed without performing any classification of any of the detected plants as the weeds based on differences between characteristics of individual ones of the detected plants other than with respect to their spatial distribution.

18. The method of claim 17, wherein, in the applying, the spray is applied according to a target uniform distribution of the spray over an entirety of the weed area.

19. The method of claim 17, wherein the areas bounding the straight lines are defined so that the straight lines are plant-row mid-point lines at respective centers of the bounding areas.

20. The method of claim 17, wherein a width of the plant rows is variably set depending on a growth stage of the detected plants.

21. The method of claim 1, wherein the plant identifier is a ratio of a first portion of the weed area covered by the detected plants to an entirety of the weed area, which includes an area not covered by the detected plants, wherein the applying is performed conditional upon that the ratio is at least a predefined threshold value, the weed area, otherwise, not being sprayed at all.

22. The method of claim 1, wherein, after the definition of the plant area and the weed area and based on the ascertainment of the plant identifier of the weed area, the spray is applied to the plant area.

* * * * *